(12) United States Patent
Li et al.

(10) Patent No.: US 9,954,220 B2
(45) Date of Patent: Apr. 24, 2018

(54) METHOD OF MANUFACTURE OF AN ELECTRODE MATERIAL AND AN ELECTRODE MATERIAL

(75) Inventors: Chilin Li, Stuttgart (DE); Joachim Maier, Wiernsheim (DE)

(73) Assignee: MAX-PLANCK-GESELLSCHAFT ZUR FORDERUNG DER WISSENSCHAFTEN E.V., Munich (DE)

( * ) Notice: Subject to any disclaimer, the term of this patent is extended or adjusted under 35 U.S.C. 154(b) by 458 days.

(21) Appl. No.: 14/407,338

(22) PCT Filed: Jun. 15, 2012

(86) PCT No.: PCT/EP2012/061444
§ 371 (c)(1),
(2), (4) Date: Jul. 21, 2015

(87) PCT Pub. No.: WO2013/185837
PCT Pub. Date: Dec. 19, 2013

(65) Prior Publication Data
US 2015/0325841 A1 Nov. 12, 2015

(51) Int. Cl.
*H01M 4/88* (2006.01)
*H01M 4/36* (2006.01)
(Continued)

(52) U.S. Cl.
CPC ........... *H01M 4/364* (2013.01); *H01M 4/136* (2013.01); *H01M 4/1397* (2013.01); *H01M 4/58* (2013.01);
(Continued)

(58) Field of Classification Search
CPC .................................. H01M 4/36; C25B 1/30
(Continued)

(56) References Cited

U.S. PATENT DOCUMENTS

2004/0062994 A1   4/2004   Amatucci
2010/0176337 A1   7/2010   Zhamu et al.
(Continued)

FOREIGN PATENT DOCUMENTS

EP    2237346 A1    10/2010
JP    H 06-336687   * 12/1994   ............... C25B 1/30

OTHER PUBLICATIONS

A. K. Padhi, et al.; "Phospho-Olivines as Positive-Electrode Materials for Rechargeable Lithium Batteries"; J. Electrochem. Soc., vol. 144, No. 4, Apr. 1997, pp. 1188-1194.
(Continued)

*Primary Examiner* — Khanh Tuan Nguyen
(74) *Attorney, Agent, or Firm* — Cantor Colburn LLP (57) ABSTRACT

The present invention relates to a method of manufacturing an amorphous electrode material comprising the steps of:
  mixing an ionic liquid containing halide compound, nanostructures and precursors to form initially planar sheets of compounds of the halide and an element of the precursor to form a mixture;
  cooling the mixture to a temperature below ambient temperature, typically less than 3° C.;
  whereby the planar sheets are coated with the ionic liquid and curled to form microspheres of agglomerations of the curled planar sheets interconnected by the nanostructures. The invention further relates to an electrode material and to an interconnected network of electrode material.

23 Claims, 6 Drawing Sheets

(51) Int. Cl.

| | |
|---|---|
| *H01M 4/58* | (2010.01) |
| *H01M 4/136* | (2010.01) |
| *H01M 4/1397* | (2010.01) |
| *H01M 4/62* | (2006.01) |
| *H01M 10/0525* | (2010.01) |
| *H01M 4/02* | (2006.01) |

(52) U.S. Cl.
CPC ........... *H01M 4/582* (2013.01); *H01M 4/625* (2013.01); *H01M 10/0525* (2013.01); *H01M 2004/021* (2013.01); *H01M 2004/028* (2013.01); *H01M 2220/20* (2013.01); *Y02T 10/7011* (2013.01)

(58) Field of Classification Search
USPC ............ 252/182.1, 519.4; 429/209, 211, 232
See application file for complete search history.

(56) References Cited

U.S. PATENT DOCUMENTS

| | | |
|---|---|---|
| 2011/0049443 A1 | 3/2011 | Hibst et al. |
| 2012/0107683 A1 | 5/2012 | Kim et al. |

OTHER PUBLICATIONS

A. Nyten, et al.; "Electrochemical performance of Li2FeSiO4 as a new Li-battery cathode material"; Electrochemistry Communications 7 (2005), pp. 156-160.

A. Yamada, et al.; "Lithium Iron Borates as High-Capacity Battery Electrodes"; Advanced Materials 2010, 22, pp. 3583-3587.

C. Li, et al.; "A High-Capacity Cathode for Lithium Batteries Consisting of Porous Microspheres of Highly Amorphized Iron Fluoride Densified from Its Open Parent Phase"; Advanced Energy Materials 2013, 3, pp. 113-119.

C. Li, et al.; "A Mesoporous Iron-Based Fluoride Cathode of Tunnel Structure for Rechargeable Lithium Batteries"; Advanced Functional Materials 2011, 21, pp. 1391-1397.

C. Li, et al.; "Carbon Nanotube Wiring of Electrodes for High-Rate Lithium Batteries Using an Imidazolium-Based Ionic Liquid Precursor as Dispersant and Binder: A Case Study on Iron Fluoride Nanoparticles"; ACS NANO 2011, vol. 5, No. 4, pp. 2930-2938.

C. Li, et al.; "Low-temperature Ionic-Liquid-Based Synthesis of Nanostructured Iron-Based Fluoride Cathodes for Lithium Batteries"; Advanced Materials 2010, 22, pp. 3650-3654.

D. Dambournet, et al.; "Dual Lithium Insertion and Conversion Mechanisms in a Titanium-Based Mixed-Anion Nanocomposite"; J. Am. Chem. Soc. 2011, 133, pp. 13240-13243.

D. Jacob, et al.; "Are Ionic Liquids Really a Boon for the Synthesis of Inorganic Materials? A General Method for the Fabrication of Nanosized Metal Fluorides"; Chem. Mater. 2006, 18, pp. 3162-3168.

David J.H. Cockayne; "The Study of Nanovolumes of Amorphous Materials Using Electron Scattering"; Annu. Rev. Mater. Res. 2007, 37, pp. 159-187.

E. Gonzalo, et al.; "A Comparative Study of a- and B-Li3FeF6: Structure and Electrochemical Behavior"; Journal of the Electrochemical Society (2010), 157 (9), pp. A1002-A1006.

F. Badway, et al.; "Carbon Metal Fluoride Nanocomposites: High-Capacity Reversible Metal Fluoride Conversion Materials as Rechargeable Positive Electrodes for Li Batteries"; Journal of the Electrochemical Society (2003), 150 (10), pp. A1318-A1327.

H. Arai, et al.; "Cathode performance and voltage estimation of metal trihalides"; Journal of Power Sources (1997), 68, pp. 716-719.

H. Li, et al.; "Li-Storage via Heterogenous Reaction in Selected Binary Metal Fluorides and Oxides"; Journal of the Electrochemical Society (2004), 151 (11), pp. A1878-A1885.

M. Bervas, et al.; "Bismuth Fluoride Nanocomposite as a Positive Electrode Material for Rechargeable Lithium Batteries"; Electrochemical and Solid-State Letters (2005), 8 (4), pp. A179-A183.

M. Thackeray, et al.; "Li2MnO3-stabilized LiMO2 (M=Mn, Ni, Co) electrodes for lithium-ion batteries"; Journal of Materials Chemistry 2007, 17, pp. 3112-3125.

N. Yabuuchi, et al.; "Effect of heat-treatment process on FeF3 nanocomposite electrodes for rechargeable Li batteries"; J. Mater. Chem., 2011, 21, pp. 10035-10041.

N. Yamakawa, et al.; Identifying the Local Structures Formed during Lithiation of the Conversion Material, Iron Fluoride, in a Li Ion Battery: A Solid-State NMR, X-Ray Diffraction, and Pair Distribution Function Analysis Study; J Am Chem Soc 2009, vol. 131, No. 30, pp. 10525-10536.

O. Delmer, et al.; "Enhanced Potential of Amorphous Electrode Materials: Case Study of RuO2"; Advanced Materials 2008, 20, pp. 501-505.

P. Barpanda, et al.; "A 3.90 V iron-based fluorosulphate material for lithium-ion batteries crystallizing in the triplite structure"; Nature Materials, vol. 10, Oct. 2011, pp. 772-779.

R. Prakash, et al.; "A ferrocene-based carbon-iron lithium fluoride nanocomposite as a stable electrode material in lithium batteries"; Journal of Materials Chemistry 2010, 20, pp. 1871-1876.

S. K. Martha, et al.; "LiMnPO4 as an Advanced Cathode Material for Rechargeable Lithium Batteries"; Journal of the Electrochemical Society (2009), 156 (7), pp. A541-A552.

S. Kim, et al.; "Fabrication of FeF3 Nanoflowers on CNT Branches and Their Application to High Power Lithium Rechargeable Batteries"; Advanced Materials 2010, 22, pp. 5260-5264.

S. Nishimura, et al.; "New Lithium Iron Pyrophosphate as 3.5 V Class Cathode Material for Lithium Ion Battery"; J. Am. Chem. Soc. 2010, vol. 132, No. 39, pp. 13596-13597.

T. Fukushima, et al.; "Molecular Ordering of Organic Molten Salts Triggered by Single-Walled Carbon Nanotubes"; Science Reports 2003, vol. 300, pp. 2072-2074.

T. Li, et al.; "Reversible Three-Electron Redox Behaviors of FeF3 Nanocrystals as High-Capacity Cathode-Active Materials for Li-Ion Batteries"; J. Phys. Chem C 2010, 114, pp. 3190-3195.

Y. Hu, et al.; "Synthesis and Electrode Performance of Nanostructured V2O5 by Using a Carbon Tube-in-Tube as a Nanoreactor and an Efficient Mixed-Conducting Network"; Angew. Chem. Int. Ed. 2009, 48, pp. 210-214.

Z. Fu et al.; "Electrochemical Reaction of Lithium with Cobalt Fluoride Thin Film Electrode"; Journal of the Electrochemical Society (2005), 152 (2), pp. E50-E55.

Z. Gong, et al.; "Recent advances in the research of polyanion-type cathode materials for Li-ion batteries"; Energy & Environmental Science 2011, 4, pp. 3223-3242.

\* cited by examiner

METHOD OF MANUFACTURE OF AN ELECTRODE MATERIAL AND AN ELECTRODE MATERIAL

CROSS-REFERENCES TO RELATED APPLICATIONS

This application is a National Phase Application of Patent Application PCT/EP2012/061444, filed on Jun. 15, 2012, which is incorporated herein by reference, in its entirety.

The present invention relates to a method of manufacturing an amorphous electrode material. The invention further relates to an electrode material and to an interconnected network of electrode material.

With the advent of green technologies, such as e.g. electric cars, and green power stations, e.g. solar energy power stations or wind parks etc. the demand for electric storage capabilities is increasing substantially, in order to ensure that no energy shortages take place due to e.g. the intermittent nature of wind and the time and weather dependence of solar energy. Lithium-based batteries are currently the technology of choice for developing renewable energy technology and electric vehicles due to their high energy density and low weight.

Different types of compounds have been investigated within the past two decades as a cathode material for Li-storage batteries. Traditional transition-metal oxide cathodes, such as layered $LiCoO_2$ and spinel $LiMn_2O_4$ have limited reversible capacity which is usually less than 150 mAh/g, which is presumably due to their structural instability. The degradation of capacity is mainly associated with the so-called unsafe oxygen extraction at a high charge voltage or temperature as has been shown for $LiCoO_2$, and for Mn-ion dissolution in electrolyte as shown with regard to $LiMn_2O_4$.

Further compounds investigated are typically based on a polyanion-framework design. One such compound investigated is olivine $LiMPO_4$ (M=Fe, Mn).[1]

Olivine $LiMPO_4$ (M=Fe, Mn) is thought to be a safer cathode material due to the more thermally stable P—O covalent bonds in the polyanions; however, their theoretical capacity (~170 mAh/g) is still limited. Furthermore, the good electroactivity of the olivine family is only achieved when a well-defined nano-structure is synthesized.

Recently, further types of polyanion-based cathodes (e.g. silicate, pyrophosphate, borate and fluorosulfate compounds) were considered in respect of either multi-electron reaction, lower polyanion mass or higher reaction voltage.[2] However apart from $LiFeBO_3$,[2c] the reversible capacity for these materials is actually distinctly below 200 mAh/g. Other typical oxide materials with such a high capacity exceeding 200 mAh/g and at least 3 V reaction voltage are vanadium and $Li_2MnO_3$ based compounds.[3] However, the former is toxic, while the latter is component-sensitive (complexity in phase diagram) and lacks safety (oxygen extraction at high voltage) even though it is very close to commercialization.

Substitution by fluorine is an alternative strategy to enhance the working voltage up to the required level for cathodes compared with their oxide counterparts (e.g. from 1.5 V in $Fe_2O_3$ to 3 V in $FeF_3$). This is due to higher ionicity of metal-fluoride bonds.[4,5] Owing to the much smaller molecular weight of F (19) than of polyanions (e.g. 95 for $(PO_4)^{3-}$), fluorides tend to exhibit a larger theoretical capacity, e.g. 237 mAh/g for the most popular $FeF_3$ cathode with 1 e$^-$ transfer. Furthermore, when a conversion reaction is involved, such as the formation of LiF and Fe by decomposition of $FeF_3$, much larger capacities (~700 mAh/g referring to 3 e$^-$ transfer) are achievable. However, small grain size and efficient conductive wiring (e.g. acetylene black, carbon nanotube) are a prerequisite to compensate for the intrinsically poor conductivity.[6]

Various nano-technologies have been reported for preparing electrode materials, such as high-energy mechanical ball-milling, HF-based aqueous solution synthesis and physical vapor deposition. Unfortunately these methods typically require the addition of a large amount of carbon additives due to the poor-defined conductive network.[5-7] Previous reports[5a,6a] have shown that a fluoride disordering or amorphization in combination with defect generation or strain relief is of significant importance for improving the Li-storage performance.

Most recently, Kang et. al. reported disordered $FeF_3$ by distorting and even disrupting Fe—F(O) octahedral chains present in an $FeF_3.3H_2O$ precursor during moderate annealing, showing good charge/discharge reversibility at around 200 mAh/g.[6b]

It was recently proposed to use iron-based fluoride cathodes with increased Li-solubilities and conductivities. These increased solubilities and conductivities are at least partly a consequence of structural expansion (cf. also hexagonal-tungsten-bronze (HTB) and pyrochlore prototypes).[8] The iron-based fluoride cathodes were synthesized using a non-aqueous, ionic liquid (IL) based precipitation technique, with the IL acting as a structure-directing agent, as well as a morphology template for well-defined mesoporosity. Although the existence of a low content of hydration water is favorable for stabilizing tunnel structures, it is still undesired in view of a partial blocking of ion transport paths so as to limit Li-storage capacity, as well as its possible release along with structural collapse during a conversion reaction leading to worsening of the electrochemical performance. The attempts to evaporate hydration water by enhancing the synthesis temperature failed due to the strong bonding within the tunnels. This is also hinted at by the highly reversible lithiation/delithiation in the whole range of solid-solution reaction.[8] Most metal fluoride electrodes (e.g. $ReO_3$-type dense structures) were prepared in structurally disordered form in a top-down approach by e.g. mechanically ball-milling commercially available $FeF_3$ or BiF3.[5]

Fluoride electrodes prepared by e.g. mechanically ball-milling commercially available $FeF_3$ of $ReO_3$-type dense structure result in electrochemically active $FeF_3$—C nanodomains.

A few chemical methods for preparing fluorides have been reported. These generally resorted to the use or formation of highly toxic and unsafe HF or its analogues (such as NaF, $H_2SiF_6$) as an F resource in aqueous solutions, mostly leading to the precipitation of fluorides consisting of inhomogeneous micro-sized grains due to fast reaction kinetics.

It is an object of the present invention to provide an alternative method of manufacture of Fe-based electrode material which is less expensive and which results in more reproducible results and in less toxic (waste) materials.

It is a further object of the invention to provide an electrode material having an improved charge/discharge reversibility while attaining higher storage capacities, for example expressed in mAh/g.

This object is satisfied by a method in accordance with claim 1, and an electrode material in accordance with claim 12.

More specifically the present invention relates to a method of manufacturing an amorphous electrode material comprising the steps of:

mixing an ionic liquid containing a halide compound and nanostructures and a powder precursor being a compound of an element of an electrode material, the mixing being carried out with the constituents of the mixture at a temperature approximating to the ice-point of the resultant liquid reaction products, for example 0° C. for a precursor including $H_2O$, to precipitate initially planar sheets of an amorphous compound of the halide and the said element of the precursor to form a mixture with the remaining ionic liquid and the nanostructures;

whereby the planar sheets are coated with the ionic liquid and curl to form nanospheres agglomerated into microspheres, the nanospheres being interconnected or interlaced by or with the nanostructures.

In this manner the individual planar sheets of compounds of the halide are coated by the IL binder containing the nanostructures, the coating by the binder causes the planar sheets to curl up due to the surface tension acting on the planar sheets. The individual nanostructures capped by the binder are attached to or interconnected with the agglomerations of curled up planar sheets. The nanostructures are frequently not only attached to one of the agglomerations, but also to at least one further agglomeration. During the application of the method a plurality of these agglomerations become interconnected with further agglomerations leading to the formation of the so-called microspheres.

The microspheres have the general shape of a sphere. This need not be a regular sphere, but could also be an irregular sphere, i.e. it generally resembles the shape of a sphere. In some circumstances the microspheres could also have the general shape of a prolate spheroid (i.e. a rugby ball or cigar shape which can also have an irregular surface structure).

Carrying out the method at low temperatures means that any water possibly present in the solution is close to freezing or has already frozen, so that the water will not easily flow into the channels present in the structure of microspheres and clog these up.

Fluoride disordering or amorphization along with defect generation or strain relief (such as occurs during curling of the planar sheets) is of significant importance for improving the Li-storage performance. In the past, amorphization was mainly carried out by mechanically ball-milling the dense structure of $FeF_3$ in a top-down approach. In contrast to this top down approach, in the present invention, $FeF_3$ is amorphized in a bottom-up approach, characterized by the alleviated release of F-ions through hydration-water-triggered hydrolysis of ionic liquid (IL) anions ($BF_4^-$) at the ice-point temperature.

The amorphization mechanism of this invention is thus totally different from previous reports. It was performed by topologically densifying an open parent framework of the pyrochlore type rather than by disordering a $ReO_3$-type dense structure.

The present invention has the following advantages in comparison to the prior art:

a) The amorphous $FeF_3$ has the morphology of micro-sized sheets with nano-sized thickness. The use of wiring in the form of single-wall carbon nanotubes (SWNTs) results in the sheets or scales curling into porous microspheres with a hierarchically mixed conductive network owing to the bilateral interaction of the IL with the SWNTs and the fluoride surfaces.

The micro-sized grains are favorable in terms of safe operation and health issues compared with discrete nanoparticles.

b) In contrast to previous aqueous chemical methods, this non-aqueous synthesis has relatively slow reaction kinetics. It is beneficial to form well-defined structure/morphology from the multiple roles of the IL as a source of F, as a solvent, as a soft template, as a structure directing agent, as an electron-wire dispersant and as an in-situ binder.

c) Due to the easy percolation of SWNTs into well-defined porous microspheres, a lesser amount of in-situ carbon additive (5~10 wt %) is required compared with previous ball-milling and aqueous methods (>15 wt %) resulting in a higher proportion of the active material in the electrode.

d) Remarkable reversible capacity as high as 230 mAh/g, close to the theoretical value for 1 e$^-$ transfer, is achieved.

The present invention can be developed further. In this connection, a scaled up version of the process can involve the recycling of the IL until the anion $BF_4^-$ is used up.

Also, in a more generalized form of the invention ILs with various cations or other solvent analogues can be explored in order to lower the cost.

The present invention can also be extended to other fluoride-based materials, in particular to cation (Li/Na/Mg)-rich and open framework phases, not only for Li batteries but also for next-generation Na/Mg batteries.

The present invention results in a very high reversible capacity exceeding 200 mAh/g by amorphizing $FeF_3$. The amorphization is achieved by densifying the open structure phase along with the removal of channel $H_2O$ in a 0° C.-BmimBF$_4$ ambience. This process is accompanied by a voltage increase of 200 mV. The generation of a hierarchical electron/ion wiring network, enabled by the interaction of ionic liquid with carbon nanotube and $FeF_3$ surfaces, significantly improves the reversibility. Fully amorphous $FeF_3$ nanosheets have been prepared using the present invention by topologically densifying an open parent framework (pyrochlore type) in a bottom-up synthesis. A key feature is the avoidance of water migration into the channels owing to the low preparation temperature (e.g. ice point). With the participation of single-wall carbon nanotube (SWNT) networks, the nanosheets are curled into porous microspheres with a hierarchical electron/ion wiring network, arising from the bilateral interaction of the IL with the SWNTs and fluoride surfaces. In this way, remarkable capacity (230 mAh/g, double as much as for the pyrochlore phase or one-third higher than HTB phase[8]) and voltage enhancement (by ~200 mV vs. pyrochlore phase) are achieved.

In a preferred embodiment of the method the nanoparticles of the material of the planar sheets are separated during the formation of the agglomerations of the curled planar sheets and adhere to the surface of the agglomerations and/or the nanospheres.

These nanoparticles promote the fragmentation of SWNTs into cross-linking carbon nanowires of smaller scale. These fine nanowires spread over the voids between aggregates, leading to a better percolation of carbon electron wires.

In a further preferred embodiment of the method this comprises the step of removing the microspheres from the residual mixture. Preferably the step of removing includes the step of washing the microspheres with a further solution, such as acetone, to remove water and optionally placing the washed microspheres into a centrifuge to remove the solution containing dissolved mixture residues.

Using solutions such as acetone aids the removal of water from the microspheres when precursors such as $Fe(NO_3)_3 \cdot 9H_2O$ are used, thereby preventing the structural channels of the microspheres from becoming blocked with water.

In yet a further preferred embodiment of the method this comprises the step of drying the microspheres at an elevated temperature. Preferably the step of drying the microspheres is carried out in a vacuum atmosphere at a temperature in the range from 60° C. to 100° C., preferably at a temperature of approximately 80° C. The drying of the microspheres advantageously provides electrode material which can be utilized for use in e.g. a Li ion battery.

Preferably the step of cooling is carried out at a temperature in the range of a range from −3 to +3° C. and most preferably at approximately 0° C. for precursors containing $H_2O$. When $Fe(NO_3)_3 \cdot 9H_2O$ is used as a precursor this reaction temperature helps prevent the infiltration of the structural channels with water.

In a preferred embodiment, 3 to 15 wt % nanostructures, preferably 5 to 15 wt %, most preferably 6 to 10 wt % nanostructures are included in the mixture and wherein the nanostructures preferably comprise conductive nanowires or nanotubes, such as single wall carbon nanotubes (SWNTs).

Preferably the ionic liquid containing a halide compound is selected from the group of ionic liquids including fluorides, such as $BmimBF_4$, chlorides, such as BmimCl, bromides, such as BmimBr and iodides, such as TBAI for the formation of the agglomerations present in the electrode material.

Advantageously the precursor is selected from the group comprising an Fe precursor, such as $Fe(NO_3)_3 \cdot 9H_2O$, a Co precursor, such as $Co(NO_3)_2 \cdot 6H_2O$, a Mn precursor, such as $Mn(NO_3)_2 \cdot 4H_2O$, a Ni precursor, such as $Ni(NO_3)_2 \cdot 6H_2O$, a Bi precursor, such as $Bi(NO_3)_3 \cdot 5H_2O$ for different types of cathode material.

In a preferred embodiment of the method the following ionic liquids are used with the following precursors:
a) $BmimBF_4$ with $Fe(NO_3)_3 \cdot 9H_2O$;
b) $C_{10}mimBF_4$ with $Fe(NO_3)_3 \cdot 9H_2O$;
c) $BmimBF_4$ with $FeCl_3 \cdot 6H_2O$;
d) $BmimPF_6$ with $Fe(NO_3)_3 \cdot 9H_2O$;
e) $BmimBF_4$ with $FeF_3 \cdot 3H_2O$;
f) BmimTFSI with $FeF_3 \cdot 3H_2O$.

Such combinations make the method a universally applicable method for the manufacture of electrode material.

In an aspect of the invention this relates to an amorphous electrode material. Such an amorphous electrode material is present in the form of porous microspheres, wherein the microspheres comprise agglomerations of nanospheres of amorphous material, nanoparticles of the said material and nanostructures, the nanostructures interconnecting or extending between the nanospheres.

Such an electrode material can be beneficially used in e.g. a lithium ion battery. The amorphous material permits an improved charge flow in such a material.

Particularly advantageously the nanospheres, also known as agglomerations, have mesoporosity and the voids present in the microspheres between the nanospheres (agglomerations) and nanostructures define a macroporosity of the microspheres. The mesopores beneficially permit an ion transport within the nanospheres, i.e. if the nanospheres are used in an electrode of a battery, the ions present in the battery can be transported via these mesopores in order to effect a charge flow in the electrode. The macropores present as voids between the nanospheres of the microspheres permit the transport of the electrolyte of the battery containing the ions to regions within the electrode, so that the charge capacity of the battery is increased. The increase in charge capacity is brought about because not only the surface region of the electrode material is subjected to the ions present in the electrolyte, but also because regions within the electrode are made available for storage of the ions of the electrolyte.

Preferably the material of the nanospheres is a halide based material, preferably a fluoride based material, such as $FeF_3$. This means that the electrode can be used in a Li ion battery, since Li ions can diffuse in fluorides increasing the storage capacity of the battery.

Advantageously the nanostructures comprise conductive nanowires or conductive nanotubes, such as carbon nanowires or carbon nanotubes. Using such conductive nanostructures a conduction of the charge created by the ion flow in the material is ensured throughout the electrode improving the efficiency of the electrode material.

Preferably 3 to 15 wt % of nanostructures, preferably 5 to 10 wt %, are present in the electrode material. Such a ratio of nanostructures has been found to be beneficial for ensuring an efficient conduction throughout the material.

Preferably the planar shaped material has a low BET surface area of preferably 15 to 25 $m^2/g$. This ensures a fairly homogenous starting structure and a well-defined morphology of aggregates.

Preferably the nanospheres have an average diameter in the range from 100 to 600 nm, in particularly advantageous embodiments the nanospheres have an average diameter in the range from 200 to 500 nm. This results in microspheres in which the mesoporosity of the material can be utilized for storage of e.g. Li ions.

In a preferred embodiment the nanoparticles are present at the surface of the nanospheres and/or of the microspheres and/or wherein the nanoparticles have an average diameter of from 3 to 15 nm.

Nanoparticles can trigger the fragmentation of conductive nanostructures into ones of smaller scale without the trade-off of conductivity, and the formation of interconnected conductive network, improving the storage performance of the electrode.

Advantageously the macropores between aggregates have an average size in the range from 50 to 500 nm. This ensures a good circulation of electrolyte containing e.g. Li ions throughout the cathode material. It is also preferred when the mesopores have an average size in the range from 0.1 to 2 nm. Such a mesopore size permits efficient storage of Li ions in the electrode.

In a very preferred embodiment the microspheres have an average size of 800 nm to 2000 nm, and are preferably approximately 1 μm in diameter. Such sizes of microspheres enable ensure a safer operation for the electrode material present in a battery.

Advantageously the amorphous electrode material has a capacity of at least 200 mAh/g after 60 charge/discharge cycles. Such a charge capacity means that this material could be a good candidate for a future possible electrode material.

In yet a further aspect of the invention this relates to an interconnected network of electrode material, preferably in the form of a chain of microspheres interconnected by nanostructures.

Further preferred embodiments of the electrode material are set forth in the dependent claims.

The invention will be described in the following by way of embodiment and with reference to the drawing in which is shown.

First of all an example will be given of how the method of the invention is used in practice.

EXAMPLE 1

A Fe precursor in the form of Fe(NO$_3$)$_3$.9H$_2$O is initially dissolved in an ionic liquid (IL) in the form of 1-butyl-3-methylimidazolium tetrafluoroborate (BmimBF$_4$) containing SWNTs (nanostructures in the form of single wall carbon nanotubes). The mixture is cooled or maintained at a temperature below ambient temperature, typically to a temperature of 0° C.

Figure 3:
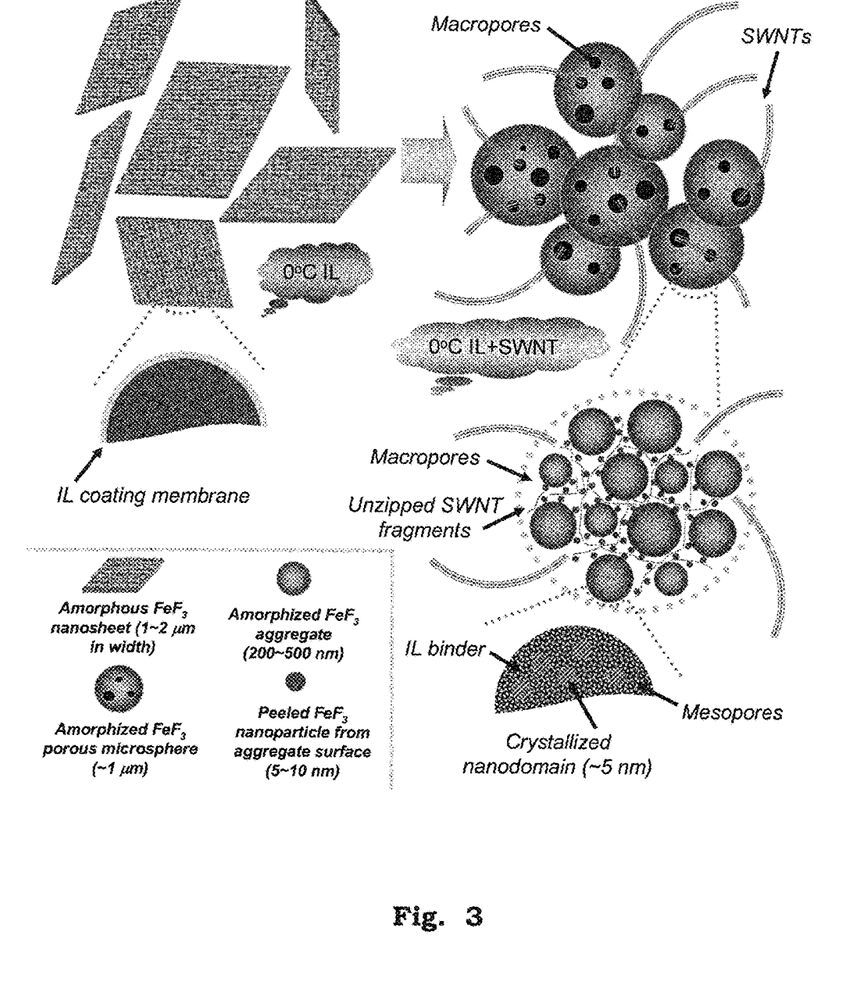
FIG. 3 a scheme of FeF$_3$ nanosheets and microspheres and their internal construction, as well as hierarchical electron/ion wiring defined from the FeF$_3$-SWNT composite.

This cooled mixture leads to the formation of free Fe$^{3+}$ and to the release of hydration water. The hydration water then hydrolyzes the BF$_4^-$ anion to produce free F$^-$, leading to the final precipitation of FeF$_3$. The FeF$_3$ is initially present in the form of planar sheets having a thickness of a size of approximately 55 nm and average planar dimensions (length and width) of 1-2 μm. In the cooled mixture the ionic liquid coats the planar sheets which can be considered to be scales having the general shape of a parallelepiped as shown in FIG. 3.

However, due to the presence of the IL and the SWNTs the scales agglomerate and curl at this temperature to form aggregates of FeF$_3$ (see FIG. 3) which can be considered as irregular nanospheres having average diameters in the range of 100-600 nm, typically 200-500 nm. The nanospheres agglomerate to form regular or irregular microspheres typically having average cross-sectional dimensions in the range from 800 nm to 1500 nm, or even up to 2500 nm. On curling of the planar sheets nanoparticles of FeF$_3$ are separated from the planar sheets and are distributed throughout the structure, the nanoparticles have a size typically in the range of 5 to 10 nm. The nanospheres have mesoporosity meaning pore sizes typically in the range from 0.5 to 5 nm. The SWNTs interconnect the nanospheres in a random manner and voids are present between the nanospheres and around the SWNTs. The voids form macropores having typical sizes in the range from 100 nm to 600 nm. The peeled off FeF$_3$ nanoparticles are distributed within the macropores and on the surface of the nanospheres and on the surface of the SWNT's.

The resultant nanospheres are typically referred to as amorphous structures. In this connection it should be noted that amorphous materials have some short-range order at the atomic length scale due to the nature of the chemical bonding between the elements in the material. It should also be noted that a large fraction of the atoms are located at or near the surface of the crystal in very small crystals and relaxation of the surface and interfacial effects distort the atomic positions leading to a decrease of the structural order.

Following the formation of the microspheres in the mixture, the mixture is washed using e.g. acetone or some other suitable solvent for the water of hydration. The washing agent is removed, for example, in a centrifuge at 6000 rpm and the residue is subsequently dried in a vacuum atmosphere at 80° C. for 20 h to form the dehydrated electrode material which is suitable for use as a cathode material, but could also be used as an anode material. For this purpose the electrode material can be adhered to a metal foil, for example, of Cu, Al or Ti. The electrode material still contains some water, but this is free water easily removed from the surface or interface and is not channel water chemically bound.

The electrode material prepared in this way can then be used as a cathode in a lithium ion battery with an anhydrous electrolyte including a solvent and a Li salt dissolved therein. The electrolyte can, for example, be EC-DMC (a volume ratio of 1:1) dissolving LiPF$_6$. In this example the anode can be a lithium anode and a glass fiber separator (GF/D) from Whatman is present between the anode and the cathode.

In order to carry out comparison tests a further sample of FeF$_3$ was prepared in a similar way, but without the addition of SWNTs. Also wired and unwired (with or without SWNTs) hydrated pyrochlore phase (FeF$_3$.0.5H$_2$O) was prepared as a comparison. This method of production was mainly distinguished by the use of a much higher reaction temperature of ~100° C.

Figure 1:
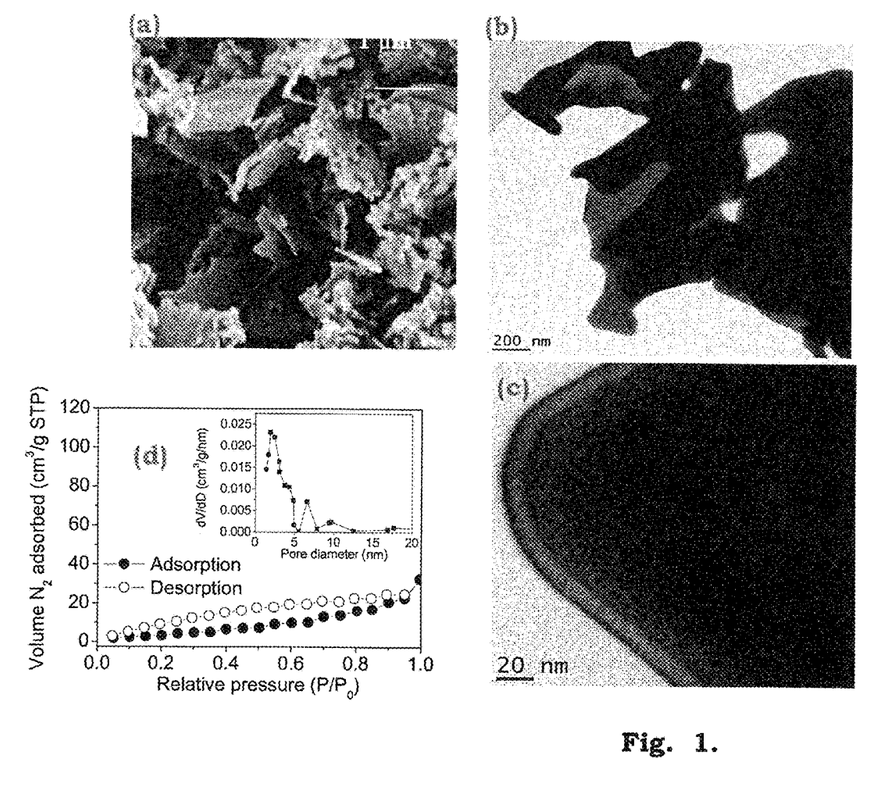
FIG. 1a-d (a) an SEM image and (b,c) TEM images of amorphous $FeF_3$ nanosheets, with the inset of (c) depicting a diffractogram of a typical amorphous structure; (d) nitrogen sorption isotherms of fully amorphous FeF$_3$ powder (No SWNT is added) with the inset depicting a Barrett-Joyner-Halenda (BJH) pore size distribution from the adsorption branch; the size for most of the pores is less than 5 nm.
Figure 2:
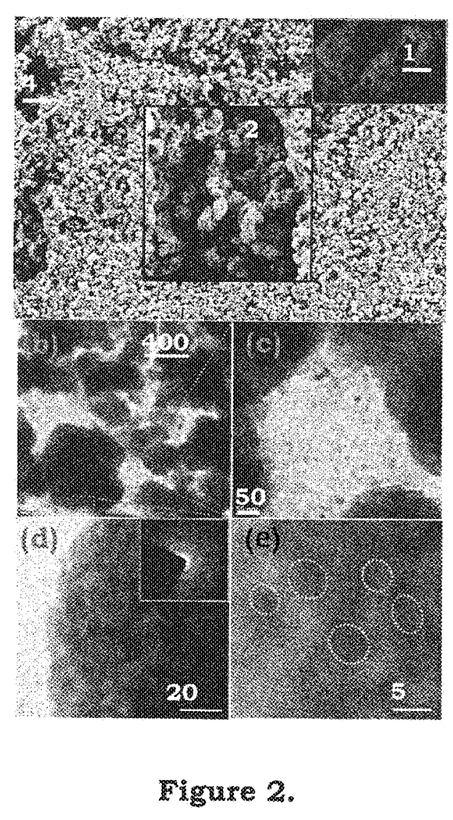
FIG. 2a-e (a) SEM images of highly amorphized FeF$_3$ microspheres wired by 10 wt % SWNTs, characterized by the morphology of porous microspheres (~1 μm) connected by SWNT network, with the inset of (a) depicting a magnified SEM image of the porous microspheres; (b) a TEM image of the interior of the porous FeF$_3$ microspheres; (c) a magnified TEM image of voids between FeF$_3$ aggregates from (b); (d) a magnified HRTEM image of the edge of the FeF$_3$ aggregate from (b), with the inset depicting a diffractogram of the corresponding disordered structure, where single diffraction spots are visible; (e) a magnified HRTEM image of the inner FeF$_3$ aggregate from (d) with crystallized nanodomains encircled by white loops.

The results of the comparison tests will now be given. FIGS. 1 and 2 compare the morphologies of highly amorphized $FeF_3$ prepared in an SWNT-free IL solvent and in an IL solvent with dispersed SWNT's at 0° C. in accordance with example 1. The samples are then characterized by scanning electron microscopy (SEM) and transmission electron microscopy (TEM). In this connection, with regard to the SWNT-free case, well-defined $FeF_3$ sheets of ~55 nm thickness and 1~2 μm width are produced and can be considered as regular miniature scales of material. The scales are then wetted by a ~15-nm-thick IL membrane (FIGS. 1*a-c*). The fuzzy halos indicate a fully amorphous structure. The temperature-dependent viscosity of IL plays a key role in morphology control. An increase of the IL viscosity (e.g. at 0° C.) is beneficial to confine $FeF_3$ into densified nanosheets with a low Brunauer-Emmett-Teller (BET) specific surface area (~18 $m^2$/g from FIG. 1*d*). The interfacial energy is significantly lowered due to the thick coating of frozen IL membrane. At an elevated temperature (e.g. at 100° C.), the IL fluidity is increased, leading to a less efficient coating. This will cause bending and reorganization of the sheets to finally generate mesoporous spheres, with a part of the original IL-coating components infiltrating into the agglomeration of microspheres and acting as a gel binder.

The influence of the addition of SWNT (e.g. 10 wt %) is similar to that of temperature increase, namely a tendency towards crystallization. However, the IL extraction is caused by interaction of the SWNT surface with π-electrons towards the imidazolium cation of IL leading to the disappearance of a thick IL shell on the surface of the $FeF_3$ aggregates (FIGS. 2*b* and *d*). When sufficient IL binders (12-16 wt % of the $FeF_3$ and binder weight) are infiltrated into the aggregates this leads to larger sizes of the aggregates (200~500 nm) and promotes the development of a mesoporous morphology. It should be noted that about 6 wt % extra carbon content was detected from carbon-sulfur analysis, roughly equivalent to 14 wt % IL binder. Some crystallized nanodomains (~5 nm) can also be detected (FIG. 2*e*), in agreement with the emergence of discrete diffraction spots on fuzzy halos in the inset of FIG. 2*d*. In addition, numerous $FeF_3$ nanoparticles (5~10 nm) are found to be peeled from the aggregates and dispersed in the surrounding voids (FIG. 2*c*), since less IL binder stays at the surface of the aggregates.

Upon participation of well-dispersed SWNTs, a mixed conductive network is formed as described in the scheme depicted in FIG. 3. The $FeF_3$ composite ultimately forms porous microspheres (~1 μm) (see e.g. the SEM image of FIG. 2*a*). This is not only due to the interaction of IL with $FeF_3$, but must also be ascribed to the interaction between SWNTs and IL-capped $FeF_3$ aggregates, which results in the formation of a network of $FeF_3$ microsphere chains connected by SWNTs. Interestingly, the segments of SWNTs embedded in the inner microspheres are unzipped into cross-linking SWNT fragments by peeled $FeF_3$ nanoparticles (FIG. 2*c*). They serve as electronic wires of smaller scale well separated by the $FeF_3$ nanoparticles, spreading over the macropores (i.e. the voids between aggregates) within the microspheres, and connect with the intact SWNTs when connecting to the microsphere subsurface. In addition, both the macropores and mesopores inside the $FeF_3$ microspheres and aggregates are important as far as quick electrolyte infiltration is concerned. The IL binder is understood to dissolve the Li-salt in an Li-based electrolyte and thus to provide an Li-ion transport function. Both the hierarchical electron and ion wirings are significantly beneficial for the Li-storage activity of $FeF_3$-SWNT composite.

Figure 4:
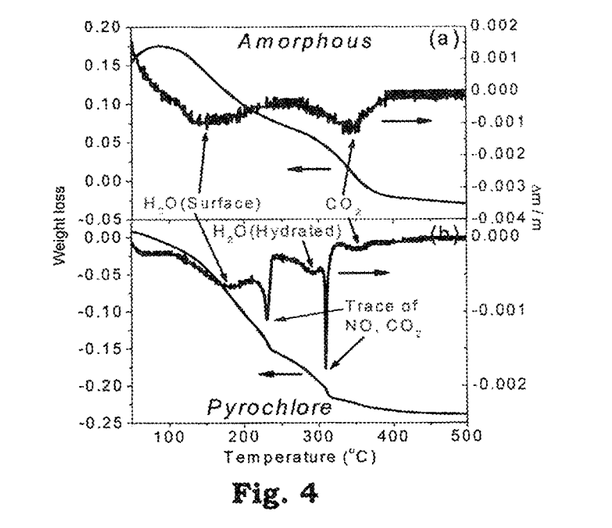
FIG. 4 (Left axis) TGA of (a) amorphous and (b) hydrated pyrochlore iron-based fluorides with a heating rate of 5 K/min under nitrogen atmosphere, and (right axis) the derivative of corresponding TGA data.

Thermogravimetric analysis coupled with mass spectroscopy (TGA-MS) is one of the effective ways to check the content of hydration water in the structure, i.e. in the cathode material as prepared. As shown in FIG. 4, the evaporation of adsorbed water at a surface occurs below 250° C. for both the amorphous phase and hydrated pyrochlore $FeF_3 \cdot 0.5H_2O$, a crystallized derivative of the amorphous phase obtained by increasing reaction temperature. For the latter, the channel water contained therein is further removed between 250-320° C. with a TGA derivative peak at 290° C. This is, however, absent for the former indicating negligible channel water in the amorphous sample. In $FeF_3 \cdot 0.5H_2O$, the corresponding weight loss is about 4 wt %, lower than the theoretical content of hydration water (~7 wt %), indicating that at least half the $H_2O$ molecules take part in the strong bonding with the adjacent Fe atoms. $CO_2$ release is mainly detected at a temperature of around 360° C. in both of the samples, although its trace release is also perceived at lower temperatures for the pyrochlore phase. It likely stems from $CO_2$ adsorption in the original materials in view of their microporous framework and mesoporous morphology, as well as from the formation of weak complexes by $CO_2$ with IL anions (or cations) during operation.

Figure 5:
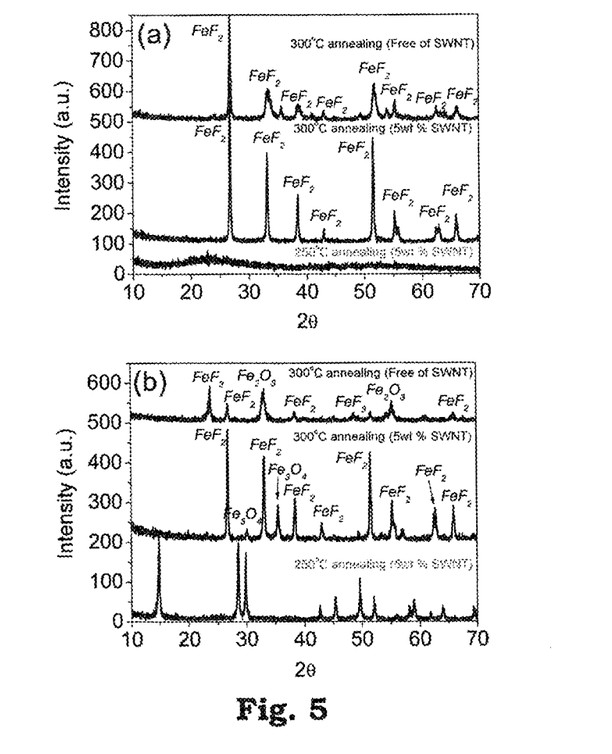
FIG. 5 Powder XRD patterns of annealed products from (a) amorphous FeF$_3$ and (b) pyrochlore FeF$_3$.0.5H$_2$O, at various temperature (250° C. or 300° C.) in argon, either free of SWNT wiring or wired by 5 wt % SWNTs; annealed products, such as FeF$_2$ (JCPD card no. 79-0745), FeF$_3$ (JCPD card no. 88-2023), Fe$_2$O$_3$ (JCPD card no. 39-0238) and Fe$_3$O$_4$ (JCPD card no. 75-1610) are labeled.

Both the amorphous and pyrochlore phases show good thermal stability up to 250° C., where no remarkable phase transformation occurs as is shown in the X-ray diffractograms (XRD) of annealed products in FIG. 5. Amorphous $FeF_3$ is prone to be reduced to $FeF_2$ by IL remainder at 300° C. More intensive and pure $FeF_2$ diffraction peaks are observed when adding SWNTs capable of stronger reducibility. Strong restriction of channel water in $FeF_3 \cdot 0.5H_2O$ promotes the simultaneous formation of iron-based oxides (mainly $Fe_2O_3$) during fluoride decomposition into $FeF_2$, as well as $ReO_3$-type $FeF_3$ having regard to the lower remainder of IL. This confirms that the heating strategy to remove hydration water is unfeasible. With the participation of SWNTs, $FeF_3$ and $Fe_2O_3$ are further reduced to $FeF_2$ and $Fe_3O_4$ respectively. However, the XRD peaks of oxides in the decomposed products of amorphous phase are negligible (FIG. 5*a*), indicating successful exclusion of channel water due to its sluggish mobility in a highly viscous IL medium (it is also confirmed by the following Li-storage behavior).

Figure 6:
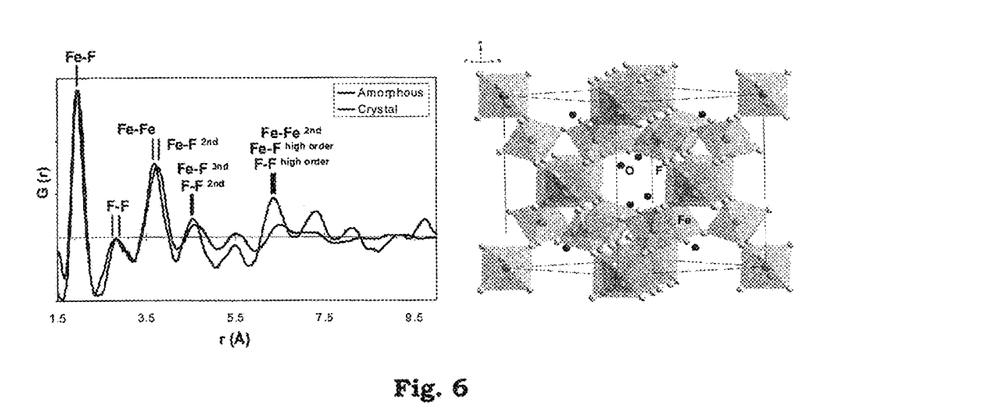
FIG. 6 pair distribution functions (PDFs) of amorphous and pyrochlore crystal phases, the standard positions of main coordination shells of the crystal phase are also labeled as a reference; the right depicting a structure sketch of pyrochlore FeF$_3$.0.5H$_2$O with cubic lattice.

The analysis of the pair distribution function (PDF) determined from the electron diffractogram gives statistical information of the radial density distribution of arbitrarily selected atoms in the investigated material. This is particularly useful to explore the local structure of the highly disordered phase. Its peak intensity is not only associated with the atomic pair density, but also with the electron scattering power, as well as the specimen thickness and shape because of the strong effect of multiple electron scattering. FIG. 6 compares the PDFs of amorphous and well-crystallized (pyrochlore) fluorides, which are normalized to the intensity of their first peaks. The latter (pyrochlore) exhibits more pronounced peaks at distances larger than 6 Å, commensurate with less long-range ordering of the amorphous phase. In view of the small amount of O and small scattering power of H, the peaks in the short-range region can be qualitatively identified, while element-specific partial PDFs strongly overlap in the long-range region. The first two peaks at ~1.97 Å and ~2.82 Å of the amorphous phase are similar to those of the crystalline phase, and correspond to the first Fe—F and F—F coordination shells, indicating that amorphization does not influence the short-range ordering characteristic of $FeF_6$ octahedral units, despite slightly extending its average Fe—F bonding by 0.03 Å. The maxima around 3.76 Å and 6.3 Å are mainly ascribed to the signals of Fe—Fe first and second coordination shells, which determine the arrangement of adjacent $FeF_6$ octahedra, and also involve minor contributions of second or higher order Fe—F shells. They are larger in position and broader in shape for the amorphous phase, indicative of a more relaxed arrangement of $FeF_6$ octahedra than in the crystallized phase. This relaxation leads to an increase of the mean Fe—F—Fe angle (spanning two adjacent octahedra) by 1.2°. Although the correlation of octahedra is still remarkable within the first order adjacency in the amorphous phase, those with second order adjacency become less correlated, therefore causing more serious broadening of the second Fe—Fe shell peak.

In spite of complete amorphization after extraction of the channel water, the locally three-dimensional microporous framework is still preserved, but with negligible channel $H_2O$ (as shown by TGA and post-annealing XRD, see FIGS. 4 and 5). Such a structural disorder is thermally stable up to 250° C. (FIG. 5a). If the yellow amorphous precipitate is still left in the IL medium or is stored in air at ambience temperature, it transforms into the white pyrochlore phase after several weeks, indicating that humidity (more efficiently than heat) favors crystallization. This process is irreversible (even under annealing) due to thermodynamically favorable bonding of $H_2O$ within the microporous frameworks, promoting the alignment of surrounding $FeF_6$ octehedrons as indicated by the PDF. The facile amorphization is associated with such a three-dimensional interconnected channel constructed by a flexible skeleton.

Figure 7:
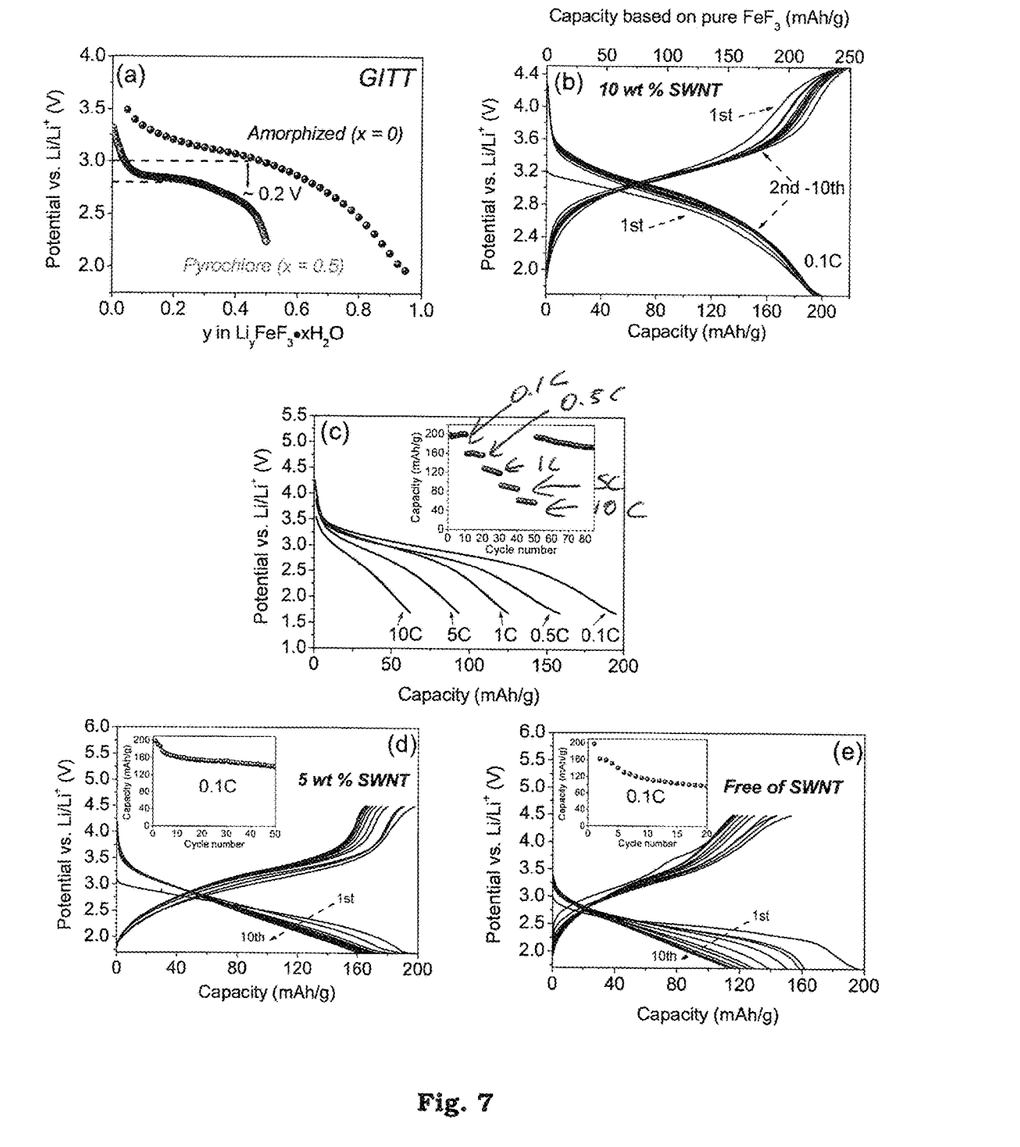
FIG. 7 (a) OCVs as a function of the Li-insertion number derived from GITT of amorphized and pyrochlore iron-based fluorides wired by 10 wt % SWNT during the second discharge process with a current density of 0.01 C for 1 h followed by a voltage relaxation for 10 h, with a voltage range of 2-4.5 V at 25° C. Voltage vs. capacity profiles of amorphized FeF$_3$ electrodes (b) wired by 10 wt % SWNTs (capacity based on pure FeF$_3$, achieved by subtracting the IL remainder is also presented), (d) wired by 5 wt % SWNTs, (e) free of SWNTs during the first 10 cycles with a rate of 0.1 C, (c) at various rates from 0.1 C to 10 C, with a voltage range of 1.7-4.5 V at 25° C., insets of (c-e): discharge capacity as a function of cycle number at corresponding rates from 0.1 C to 10 C.

According to the open circuit voltages (OCVs) derived by the galvanostatic intermittent titration technique (GITT), the advantages of highly amorphized $FeF_3$ wired by 10 wt % SWNT mainly lie in (i) the doubled Li-storage capacity (close to 1 e$^-$ transfer) and (ii) the enhanced average discharge voltage (by ~200 mV) compared with hydrated pyrochlore phase with the same amount of SWNT wires (FIG. 7a). This can be ascribed to the removal of hydration water, densification of open structure or to the enhanced Gibbs free energy of formation of the amorphized phase. The charge-discharge profiles of the former performed at 25° C. exhibit a typical solid-solution behavior around 3V, achieving a reversible capacity as high as 200 mAh/g at 0.1 C without serious fading within 85 cycles (FIGS. 7b and c). On subtracting the weight of the IL remainder (14 wt %), the capacity based on pure $FeF_3$ can reach up to ~230 mAh/g, very close to the theoretical value (237 mAh/g for 1 e$^-$ transfer). Satisfactory rate performance without serious voltage polarization (e.g. 125 mAh/g at 1 C, 65 mAh/g at 10 C) is attributed to the hierarchically mixed conductive network mentioned above. The Li-storage capacity of our $FeF_3$ amorphized from the pyrochlore phase is comparable to that of the disordered phase obtained from the $ReO_3$-based structure. The material in accordance with the invention has the advantage of either distinctly lower carbon content (as compared with Ref. [5a,6a]) or higher environmental benignity (HF is used in Ref. [6b]).

Figure 8:
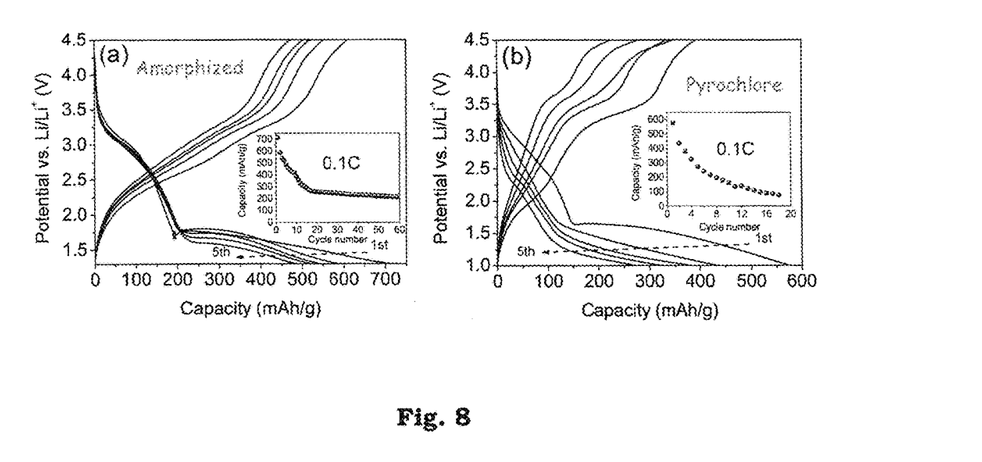
FIG. 8 voltage vs. capacity profiles of (a) amorphized FeF$_3$ and (b) pyrochlore FeF$_3$.0.5H$_2$O electrodes wired by 10 wt % SWNTs during the first 5 cycles with a rate of 0.1 C, under a wider voltage range of 1.3-4.5 V or 1.0-4.5 V at 25° C., with the insets depicting a corresponding discharge capacity as a function of cycle number at the rate of 0.1 C.

One should note that the percolation of electron wiring is more difficult to optimize than ion wiring in view of the large size of $FeF_3$ aggregates, which limits further insertion of electron wires. As shown in FIG. 7d, on reducing the amount of SWNT wires (e.g. 5 wt %), both the capacity and voltage profiles correspondingly degrade with progressive cycling. The situation is even worse in the SWNT-free case characterized by extremely disproportionate electron versus ion wiring (FIG. 7e). Although the initial discharge capacity close to 200 mAh/g is achievable, the reversible capacity at 0.1 C can only be maintained at 140 mAh/g for the electrode containing 5 wt % SWNTs after 50 cycles, as well as at 90 mAh/g for the SWNT-free electrode after 20 cycles. By setting the lower limit of the voltage to 1.3 V (FIG. 8a), the initial discharge capacity exceeds 700 mAh/g due to the participation of conversion reaction, the capacity of which however undergoes gradual degradation. This is not unexpected since such a triphase-transformation reaction is exceedingly more demanding in terms of kinetics than a single-phase reaction. Anyway, the region of solid-solution reaction referring to a high capacity of ~200 mAh/g is well preserved even after 60 cycles with repeated deeper discharge. It is ascribed to the absence of hydration water. Otherwise, it would undergo quick degradation as long as hydration water is released into the electrolyte followed by a conversion reaction induced structure collapse below 1.7 V, as observed in the pyrochlore phase (FIG. 8b). The initial discharge capacity is as high as 575 mAh/g, whereas the reversible capacity after 18 cycles is below 100 mAh/g.

In summary, a highly amorphized $FeF_3$ composite cathode for large-capacity lithium batteries, characterized by hierarchical electron/ion wiring based on the interaction of IL with carbon nanotube and $FeF_3$ surfaces (i.e. well-dispersed SWNTs and its unzipped fragments as electron wires, macropores in $FeF_3$ microspheres, mesopores in $FeF_3$ aggregates and IL binder layer as ion wires), was synthesized by an 0° C.-IL assisted precipitation method. A high reversible capacity close to the theoretical value calculated for $LiFeF_3$ formation (>200 mAh/g) is achievable before any conversion reaction begins. This process is accompanied by a voltage increase of 200 mV vs. pyrochlore phase. The hydration water, despite being intrinsically strongly bonded in the open framework, can be successfully removed by enhancing the viscosity of the IL carrier. It is the origin of densification and amorphization of the open structure phase, and is beneficial for both reaction voltage and capacity. Fluoride polymorphs are not only expected to be relevant for Li-based batteries but also in other fields of solid state ionics such as fuel cells.

Hierarchically electron-wired iron trifluoride of highly amorphized structure was synthesized by ionic liquid (IL) 1-butyl-3-methylimidazolium tetrafluoroborate ($BmimBF_4$) (Aldrich, >98%) and iron (III) nitrate nonahydrate ($Fe(NO_3)_3·9H_2O$) precursor powder (Aldrich, 99.99%) under the participation of well-dispersed single-wall carbon nanotubes (SWNTs) grown by laser ablation (Sineurope Nanotech). A similar nonaqueous phase precipitation method and its synthesis mechanism have been described elsewhere. Therein, the $BmimBF_4$ IL serves as a co-solvent, soft template and fluorine source, and additionally functions as dispersant and in-situ binder when SWNTs were added. Firstly, an expected amount of SWNT cluster (e.g. 5~10 wt % in the final weight of composite electrode) was added into 10 mL of $BmimBF_4$, which then was agitated at 50° C. for 12 h to form uniform black solvent. After it was cooled to 0° C. in an ice-water ambience, 1 g $Fe(NO_3)_3·9H_2O$, which provides free iron ion and hydration water for $BmimBF_4$ hydrolysis, was gradually added to the SWNT-suspended IL solvent in an agitation state. The precipitated phase was formed and stabilized in the ice-water ambience for 12 h, and then was rapidly removed from the IL medium. These products were washed with acetone and centrifuged at 6000 rpm five times to remove residual IL and other organic impurities, followed by subsequent drying under vacuum at 80° C. for 20 h. Fully amorphous FeF$_3$ without a prior addition of SWNTs was prepared in a similar way. Wired or unwired hydrated pyrochlore phase (FeF$_3$.0.5H$_2$O) was also prepared as a comparison, mainly distinguished by a much higher reaction temperature of ~100° C.

SWNT-wired and unwired electrode morphologies were investigated by a JEOL 6300F field-emission scanning electron microscopy (SEM) (JEOL, Tokyo, Japan) operated at 15 keV, as well as by high-resolution transmission electron microscopy (HRTEM) using a JEOL 4000FX transmission electron microscope (TEM) (JEOL, Tokyo, Japan) operated at 400 keV, or using Zeiss EM912 Omega TEM (Zeiss, Stuttgart, Germany) operated at 120 keV. Selected-area electron diffraction (SAED) measurements using the latter TEM were also performed to check the structure and crystallinity of these samples. Pair distribution functions (PDFs) were extracted by applying a sine Fourier transformation of one-dimensional profiles of the obtained diffraction patterns. The structural evolution after annealing at different temperatures in argon atmosphere was detected by X-ray diffraction (XRD) using a Philips PW3710 (40 kV/30 mA) diffractometer with Cu-Kα radiation. Thermogravimetric analysis coupled with mass spectroscopy (TGA-MS) was carried out by a NETZSCH TG 209 at a heating rate of 5 K/min in a nitrogen atmosphere. The Brunauer-Emmett-Teller (BET) method was used to calculate the specific surface area and pore diameter distribution. The nitrogen sorption isotherms were obtained with an Autosorb-1 system (Quanta Chrome). The exact carbon content in wired materials was detected by a Carbon Sulfur Determinator (Eltra, CS800).

Two-electrode Swagelok-type cells were assembled with synthesized iron-based fluorides or their wired composites as a working electrode and high-purity lithium foil (Aldrich) was used as a counter electrode. The working electrodes were prepared by mixing fluorides, carbon black and poly (vinyl difluoride) (PVDF) with a weight ratio of 80:10:10, which were then pasted on pure Titanium foil (99.6%, Goodfellow) followed by drying in vacuum at 80° C. for 20 h. Glass fiber (GF/D) from Whatman was employed as the separator. The electrolyte involves 1 M LiPF$_6$ in a non-aqueous mixture of ethylene carbonate (EC) and dimethyl carbonate (DMC) with a volume ratio of 1:1 (Ube Industries Ltd). The cells were assembled in an Ar-filled glove box. Galvanostatic charge-discharge measurements of fluoride cathodes vs. Li/Li$^+$ were performed at room temperature under different rates (0.1~10 C) in various voltage ranges (e.g. 1.7-4.5 V, or wider 1.3-4.5 V and 1.0-4.5 V) on an Arbin MSTAT battery test system. Galvanostatic intermittent titration technique (GITT) was implemented with a current density of 0.01 C for 1 hour followed by a voltage relaxation for 10 hours, under a voltage range of 2-4.5 V at 25° C.

Although the use of SWNTs is preferred because of the hollow nature of the nanotubes contributes to the electronic and ionic conductivity, it is also possible to use other forms of nanostructures, such as carbon nanofibers or nanoribbons or graphene.

In addition the invention is by no means limited to the preparation of an electrode material for Li ion batteries, but can generally applied for the preparation of electrode materials for other applications such as electrodes for Ma and NA batteries. Also the pre-cursor is not limited to an Fe precursor in the form of Fe(NO$_3$)$_3$.9H$_2$O, but can also be used with other types of Fe precursors and with precursors of other materials. Typical precursors for can for example also include FeCl$_3$.6H$_2$O, FeF$_3$.3H$_2$O, Co(NO$_3$)$_2$.6H$_2$O, Mn(NO$_3$)$_2$.4H$_2$O, Bi(NO$_3$)$_3$.5H$_2$O and Cr(NO$_3$)$_3$.9H$_2$O.

In addition the ionic liquid is not restricted to BmimBF$_4$, but can also be C$_{10}$mimBF$_4$, BmimPF$_6$ and BmimTFSI.

Some further examples of the invention will now be given showing the general applicability of the invention:

EXAMPLE 2

A Fe precursor in the form of Fe(NO$_3$)$_3$.9H$_2$O is initially dissolved in an ionic liquid (IL) in the form of 1-decyl-3-methylimidazolium tetrafluoroborate (C$_{10}$mimBF$_4$) containing SWNTs (nanostructures in the form of single wall carbon nanotubes). The mixture is cooled or maintained at a temperature of approximately 0° C. This cooled mixture also leads to the formation of free Fe$^{3+}$ and to the release of hydration water. The hydration water then hydrolyzes the fluoride anion to produce free F$^-$, leading to the final precipitation of FeF$_3$.

The IL and the SWNTs cause the scales to curl and agglomerate to form nanospheres of FeF$_3$ (see e.g. FIG. 3) which have average diameters typically in the range of 200-500 nm. The nanospheres agglomerate to form the microspheres typically having average cross-sectional dimensions in the range from 800 nm to 2000 nm.

EXAMPLE 3

A Fe precursor in the form of FeCl$_3$.6H$_2$O is initially dissolved in an ionic liquid (IL) in the form of 1-butyl-3-methylimidazolium tetrafluoroborate (BmimBF$_4$) containing SWNTs (nanostructures in the form of single wall carbon nanotubes). The mixture is cooled or maintained at a temperature of approximately 0° C. This cooled mixture also leads to the formation of free Fe$^{3+}$ and to the release of hydration water. The hydration water then hydrolyzes the fluoride anion to produce free F$^-$, leading to the final precipitation of FeF$_3$.

The IL and the SWNTs cause the scales to curl and agglomerate to form nanospheres of FeF$_3$ (see e.g. FIG. 3) which have average diameters typically in the range of 200-500 nm. The nanospheres agglomerate to form the microspheres typically having average cross-sectional dimensions in the range from 800 nm to 2000 nm.

EXAMPLE 4

A Fe precursor in the form of Fe(NO$_3$)$_3$.9H$_2$O is initially dissolved in an ionic liquid (IL) in the form of 1-butyl-3-methylimidazolium hexafluorophosphate (BmimPF$_6$) containing SWNTs (nanostructures in the form of single wall carbon nanotubes). The mixture is cooled or maintained at a temperature of approximately 0° C. This cooled mixture also leads to the formation of free Fe$^{3+}$ and to the release of hydration water. The hydration water then hydrolyzes the fluoride anion to produce free F$^-$, leading to the final precipitation of FeF$_3$.

The IL and the SWNTs cause the scales to curl and agglomerate to form nanospheres of FeF$_3$ (see e.g. FIG. 3) which have average diameters typically in the range of 200-500 nm. The nanospheres agglomerate to form the microspheres typically having average cross-sectional dimensions in the range from 800 nm to 2000 nm.

EXAMPLE 5

A Fe precursor in the form of FeF$_3$.3H$_2$O is initially dissolved in an ionic liquid (IL) in the form of 1-butyl-3-methylimidazolium tetrafluoroborate (BmimBF$_4$) containing SWNTs (nanostructures in the form of single wall carbon nanotubes). The mixture is cooled or maintained at a temperature of approximately 0° C. This cooled mixture also leads to the formation of free $Fe^{3+}$ and to the release of hydration water. The hydration water then hydrolyzes the fluoride anion to produce free $F^-$, leading to the final precipitation of $FeF_3$.

The IL and the SWNTs cause the scales to curl and agglomerate to form nanospheres of $FeF_3$ (see e.g. FIG. 3) which have average diameters typically in the range of 200-500 nm. The nanospheres agglomerate to form the microspheres typically having average cross-sectional dimensions in the range from 800 nm to 2000 nm.

EXAMPLE 6

A Fe precursor in the form of $FeF_3.3H_2O$ is initially dissolved in an ionic liquid (IL) in the form of 1-butyl-3-methylimidazolium bis(trifluoromethylsulfonyl)imide (BmimTFSI) containing SWNTs (nanostructures in the form of single wall carbon nanotubes). The mixture is cooled or maintained at a temperature of approximately 0° C. This cooled mixture also leads to the formation of free $Fe^{3+}$ and to the release of hydration water. The hydration water then hydrolyzes the fluoride anion to produce free $F^-$, leading to the final precipitation of $FeF_3$.

The IL and the SWNTs cause the scales to curl and agglomerate to form nanospheres of $FeF_3$ (see e.g. FIG. 3) which have average diameters typically in the range of 200-500 nm. The nanospheres agglomerate to form the microspheres typically having average cross-sectional dimensions in the range from 800 nm to 2000 nm.

The following references give some insight into the technological background to the present invention:

[1] a) A. K. Padhi, K. S. Nanjundaswamy, J. B. Goodenough, *J. Electrochem. Soc.* 2003, 150, 1188; b) S. K. Martha, B. Markovsky, J. Grinblat, Y. Gofer, O. Haik, E. Zinigrad, D. Aurbach, T. Drezen, D. Wang, G. Deghenghi, I. Exnar, *J. Electrochem. Soc.* 2009, 156, A541.

[2] a) A. Nyten, A. Abouimrane, M. Armand, T. Gustafsson, J. O. Thomas, *Electrochem. Commun.* 2005, 7, 156; b) S. Nishimura, M. Nakamura, R. Natsui, A. Yamada, *J. Am. Chem. Soc.* 2010, 132, 13596; c) A. Yamada, N. Iwane, Y. Harada, S. Nishimura, Y. Koyama, I. Tanaka, *Adv. Mater.* 2010, 22, 3583; d) P. Barpanda, M. Ati, B. C. Melot, G. Rousse, J. N. Chotard, M. L. Doublet, M. T. Sougrati, S. A. Corr, J. C. Jumas, J. M. Tarascon, *Nature Mater.* 2011, 10, 772; e) Z. L. Gong, Y. Yang, *Energy Environ. Sci.* 2011, 4, 3223.

[3] a) M. M. Thackeray, S. H. Kang, C. S. Johnson, J. T. Vaughey, R. Benedek, S. A. Hackney, *J. Mater. Chem.* 2007, 17, 3112; b) Y. S. Hu, X. Liu, J. O. Müller, R. Schlögl, J. Maier, D. S. Su, *Angew. Chem. Int. Ed.* 2009, 48, 210.

[4] H. Li, P. Balaya, J. Maier, *J. Electrochem. Soc.* 2004, 151, A1878.

[5] a) F. Badway, F. Cosandey, N. Pereira, G. G. Amatucci, *J. Electrochem. Soc.* 2003, 150, A1318; b) H. Arai, S. Okada, Y. Sakurai, J. Yamaki, *J. Power Sources* 1997, 68, 716; c) M. Bervas, F. Badway, L. C. Klein, G. G. Amatucci, *Electrochem. Solid-State Lett.* 2005, 8, A179.

[6] a) N. Yabuuchi, M. Sugano, Y. Yamakawa, I. Nakai, K. Sakamoto, H. Muramatsu, S. Komaba, *J. Mater. Chem.* 2011, 21, 10035; b) S. W. Kim, D. H. Seo, H. Gwon, J. Kim, K. Kang, *Adv. Mater.* 2011, 22, 5260; c) R. Prakash, A. K. Mishra, A. Roth, C. Kübel, T. Scherer, M. Ghafari, H. Hahn, M. Fichtner, *J. Mater. Chem.* 2010, 20, 1871;

[7] a) Z. W. Fu, C. L. Li, W. Y. Liu, J. Ma, Y. Wang, Q. Z. Qin, *J. Electrochem. Soc.* 2005, 152, E50; b) E. Gonzalo, A. Kuhn, F. Garcia-Alvarado, *J. Electrochem. Soc.* 2010, 157, A1002; c) T. Li, L. Li, Y. L. Cao, X. P. Ai, H. X. Yang, *J. Phys. Chem. C* 2010, 114, 3190.

[8] a) C. L. Li, L. Gu, S. Tsukimoto, P. A. van Aken, J. Maier, *Adv. Mater.* 2010, 22, 3650; b) C. L. Li, L. Gu, J. W. Tong, S. Tsukimoto, J. Maier, *Adv. Funct. Mater.* 2011, 21, 1391; c) C. L. Li, L. Gu, J. W. Tong, J. Maier, *ACS Nano* 2011, 5, 2930.

[9] D. S. Jacob, L. Bitton, J. Grinblat, I. Felner, Y. Koltypin, A. Gedanken, *Chem. Mater.* 2006, 18, 3162.

[10] T. Fukushima, A. Kosaka, Y. Ishimura, T. Yamamoto, T. Takigawa, N. Ishii, T. Aida, *Science* 2003, 300, 2072.

[11] a) N. Yamakawa, M. Jiang, B. Key, C. P. Grey, *J. Am. Chem. Soc.* 2009, 131, 10525; b) D. Dambournet, K. W. Chapman, P. J. Chupas, R. E. Gerald, N. Penin, C. Labrugere, A. Demourgues, A. Tressaud, K. Amine, *J. Am. Chem. Soc.* 2011, 133, 13240.

[12] C. L. Li, C. L. Yin, L. Gu, R. E. Dinnebier, X. K. Mu, P. A. van Aken, J. Maier, in preparation.

[13] O. Delmer, P. Balaya, L. Kienle, J. Maier, *Adv. Mater.* 2008, 20, 501.

[14] D. J. H. Cockayne, *Annu. Rev. Mater. Res.* 2007, 37, 159.

The invention claimed is:

1. A method of manufacturing an amorphous electrode material comprising the steps of:

mixing an ionic liquid containing a halide compound and nanostructures and a powder precursor being a compound of an element of an electrode material to form a mixture, the mixing being carried out with constituents of the mixture at a temperature approximating to an ice-point of the mixture, to precipitate initially planar sheets of an amorphous compound of the halide and the said element of the precursor to form said mixture with the remaining ionic liquid and the nanostructures;

whereby the planar sheets are coated with the ionic liquid and curl to form nanospheres agglomerated into microspheres, the nanospheres being interconnected or interlaced by or with the nanostructures and having mesopores, with macropores or channels being present between the nanospheres.

2. The method in accordance with claim 1, wherein nanoparticles of the material of the planar sheets are separated during the formation of the agglomerations of the curled planar sheets and adhere to at least one of the surface of the agglomerations and the nanospheres.

3. The method in accordance with claim 1 further comprising a step of removing the microspheres from the mixture.

4. The method in accordance with claim 3, wherein the step of removing includes a step of washing the microspheres with a further solution to remove water and optionally placing the washed microspheres into a centrifuge to remove the solution containing dissolved mixture residues.

5. The method in accordance with claim 1, further comprising a step of drying the microspheres at an elevated temperature.

6. The method in accordance with claim 5, wherein the step of drying the microspheres is carried out in a vacuum atmosphere at a temperature in the range from 60° C. to 100° C.

7. The method in accordance with claim 1, wherein the temperature approximating the ice point of the mixture is in a range from −3 to +3° C.

8. The method in accordance with claim 1, wherein 3 to 15 wt % nanostructures are included in the mixture.

9. The method in accordance with claim 1, wherein the ionic liquid containing a halide compound is selected from the group of ionic liquids including fluorides, chlorides, bromides, and iodides for the formation of the agglomerations present in the electrode material.

10. The method in accordance with claim 9, wherein the precursor is selected from the group comprising an Fe precursor, a Co precursor, an Mn precursor, an Ni precursor, a Bi precursor for different types of cathode material, and wherein the following ionic liquids are used with the following precursors:
a) BmimBF4 with Fe(NO3)3.9H2O;
b) C10mimBF4 with Fe(NO3)3.9H2O;
c) BmimBF4 with FeCl3.6H2O;
d) BmimPF6 with Fe(NO3)3.9H2O;
e) BmimBF4 with FeF3.3H2O;
f) BmimTFSI with FeF3.3H2O.

11. The method in accordance with claim 1, wherein the precursor is selected from the group comprising an Fe precursor, a Co precursor, an Mn precursor, an Ni precursor, a Bi precursor for different types of cathode material.

12. An amorphous electrode material in the form of porous microspheres, wherein the microspheres comprise agglomerations of nanospheres of amorphous material, nanoparticles of the said material and nanostructures, the nanostructures interconnecting or extending between the nanospheres, wherein the nanospheres have mesopores and macropores or channels present between the nanospheres.

13. The amorphous electrode material in accordance with claim 12, wherein the amorphous electrode material is manufactured in a method comprising the steps of:
mixing an ionic liquid containing a halide compound and the nanostructures and a powder precursor being a compound of an element of an electrode material to form a mixture, the mixing being carried out with constituents of the mixture at a temperature approximating to an ice-point of the mixture, to precipitate initially planar sheets of an amorphous compound of the halide and the said element of the precursor to form a mixture with the remaining ionic liquid and the nanostructures;
whereby the planar sheets are coated with the ionic liquid and curl to form the nanospheres agglomerated into the microspheres, the nanospheres being interconnected or interlaced by or with the nanostructures.

14. The amorphous electrode material in accordance with claim 12, wherein further macropores are present between the microspheres.

15. The amorphous electrode material in accordance with claim 12, wherein the material of the nanospheres is a halide based material.

16. The amorphous electrode material in accordance with claim 12, wherein the nanostructures comprise conductive nanowires or conductive nanotubes.

17. The amorphous electrode material in accordance with claim 12, wherein 3 to 15 wt % of nanostructures are present in the electrode material.

18. The amorphous electrode material in accordance with claim 12, wherein the nanospheres have an average diameter in the range from 100 to 600 nm.

19. The amorphous electrode material in accordance with claim 12, wherein the nanoparticles are present at at least one of the surface of the nanospheres and of the microspheres.

20. The amorphous electrode material in accordance with claim 12, wherein the nanoparticles have an average diameter of from 3 to 15 nm.

21. The amorphous electrode material in accordance with claim 12, wherein the planar shaped material has a low BET surface area of 15 to 25 m2/g, and/or wherein the macropores between aggregates have an average size in the range from 50 to 500 nm and/or wherein the mesopores have an average size in the range from 0.1 to 2 nm, and/or wherein the microspheres have an average size of 800 nm to 2000 nm.

22. The amorphous electrode material in accordance with claim 12, wherein the material has a capacity of at least 200 mAh/g after 60 charge/discharge cycles.

23. An interconnected network of amorphous electrode material comprising an amorphous electrode material in accordance with claim 12, wherein at least some of the microspheres are interconnected with nanostructures to form chains of microspheres.

* * * * *